United States Patent
Higginbotham et al.

[15] 3,639,730
[45] Feb. 1, 1972

[54] OPTICAL READER SYSTEM

[72] Inventors: Roy F. Higginbotham, Plantation; Fred D. Blonder, Ft. Lauderdale; David E. Snyder, Hollywood, all of Fla.

[73] Assignee: Datatype Corporation, Miami, Fla.

[22] Filed: Sept. 11, 1970

[21] Appl. No.: 71,505

[52] U.S. Cl. ................................................... 235/61.11 E
[51] Int. Cl. .......................................................... G06k 7/10
[58] Field of Search .............. 235/61.11 R, 61.11 D, 61.11 E; 200/46; 250/219 D, 219 DC

[56] References Cited

UNITED STATES PATENTS

| | | | |
|---|---|---|---|
| 3,321,748 | 5/1967 | Holland | 235/61.11 E |
| 3,521,033 | 7/1970 | May | 235/61.11 E |
| 3,553,435 | 1/1971 | Pike | 235/61.11 E |

*Primary Examiner*—Daryl W. Cook
*Attorney*—Hood, Gust, Irish, Lundy & Coffey

[57] ABSTRACT

A system for optically reading data printed in transversely extending lines on a document comprising a scanning head, means for supporting the scanning head for transverse movement relative to such a document, first drive means for reciprocating the scanning head on the supporting means, second drive means for moving such a document longitudinally relative to the scanning head, the second drive means including friction drive roller means for engaging and moving such a document, a motor, electrically operated clutch means for drivingly connecting the roller means to the motor, and electrically operated brake means for stopping the roller means, and control means for the first and second drive means. The control means includes means for optically detecting a line of data on such a document and operating the clutch means and brake means to stop such longitudinal movement of such a document and to start movement of the scanning head away from its initial starting position. The first drive means includes a drive pulley, at least one idler pulley, flexible means trained about the pulleys, a continuously running drive motor, and clutch means for drivingly connecting the drive pulley to the drive motor. The flexible means is fastened to one point on the periphery of the drive pulley and the scanning head is fastened to a point on the flexible means. A coiled tension spring is provided for returning the scanning head to its initial starting position when the drive pulley is disengaged from the drive motor.

19 Claims, 5 Drawing Figures

INVENTORS
ROY F. HIGGINBOTHAM
FRED D. BLONDER
DAVID E. SNYDER
BY Hood, Gust, Irish & Lundy
ATTORNEY

INVENTORS
ROY F. HIGGINBOTHAN
FRED D. BLONDER
DAVID E. SNYDER

INVENTORS
ROY F. HIGGINBOTHAM
FRED D. BLONDER
DAVID E. SNYDER

BY Hood, Gust, Irish & Lundy
ATTORNEYS

OPTICAL READER SYSTEM

It is an object of our present invention to provide an improved system for optically reading data printed in transversely extending lines on a document. We refer to the copending Joseph M. Zappia patent application Ser. No. 828,238 filed May 27, 1969 which discloses a system for optically scanning and reading data on a document, the system comprising a scanning head arranged for transverse movement relative to such a document, drive means for providing relative longitudinal movement between the scanning head and such a document, means for moving the scanning head along a line of data at a constant, predetermined rate of speed, light source means carried by the scanning head and arranged to project light at such a document, a light-responsive semiconductor device carried by the scanning head, optical means for projecting light reflected from such a document toward the semiconductor device, whereby the concentration of light on the semiconductor device depends on the presence or absence as well as the width and spacing of graphical symbols in the line of data being scanned, an output device, and circuit means for operatively connecting the semiconductor device to the output device. The said Zappia application also discloses drive means for providing relative longitudinal movement between the scanning head and such a document and control means for the drive means, the control means including optical means for finding a transversely extending line of data to be scanned and operating the drive means to stop such relative longitudinal movement, whereby the scanning head can scan such a line.

Our present invention is an improvement over the system disclosed and claimed in the said Zappia application in that it comprises an improved drive means for the scanning head, an improved drive means for the document feed, and an improved control system for operating the respective drive means at the proper times.

Other objects and features of our present invention will become apparent as this description progresses.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
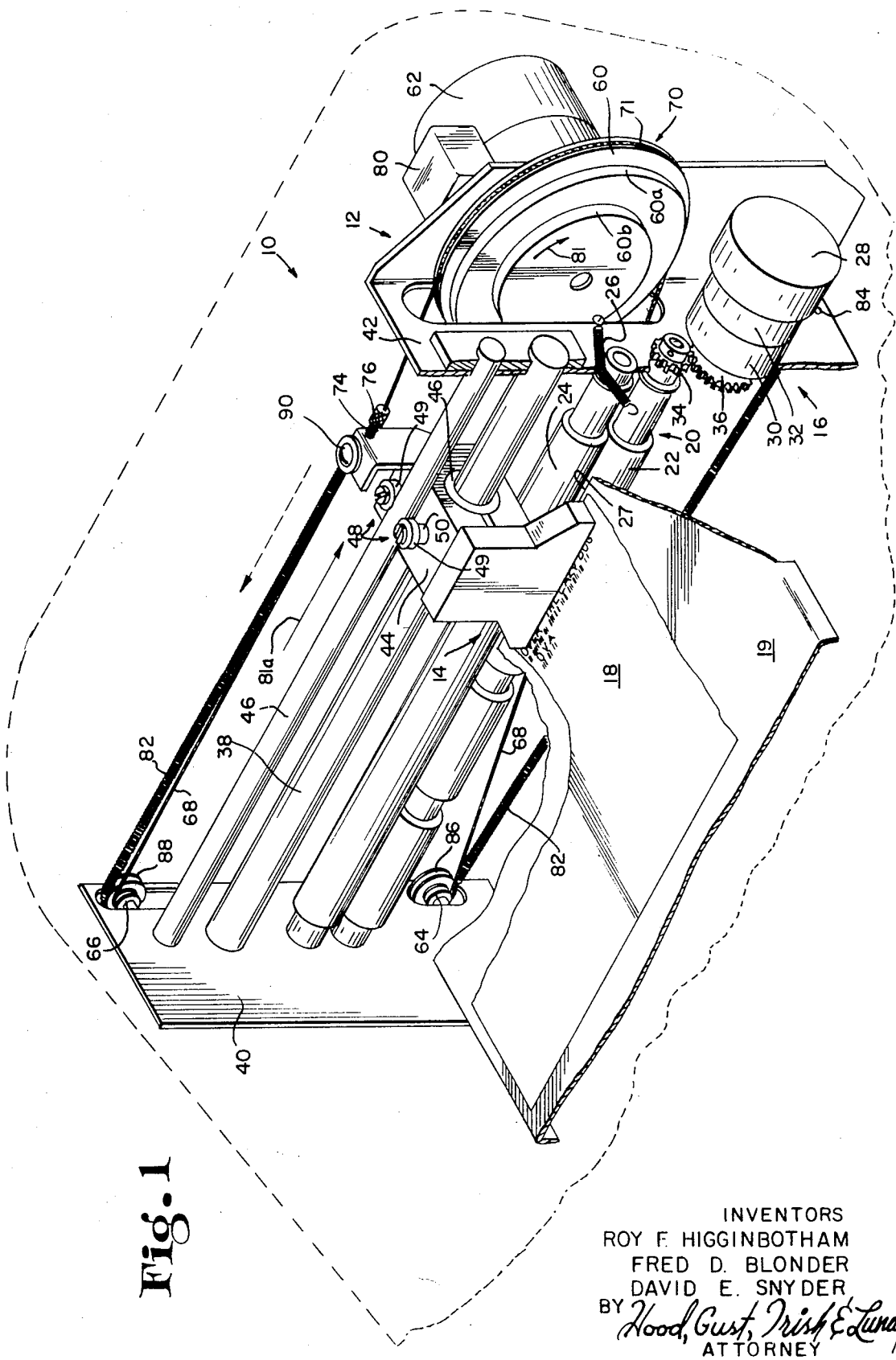
FIG. 1 is a fragmentary perspective view, partially cut away and partially sectioned, showing our system for feeding the document longitudinally relative to the scanning head as well as our system for moving the scanning head transversely relative to the document.

Referring now to the drawings, and particularly to FIG. 1, it will be seen that our optical reader system, indicated generally by the reference numeral 10, comprises first drive means 12 for reciprocating a transversely movable scanning head 14 and second drive means 16 for moving a document 18 longitudinally under the path of the scanning head. The document 18 rests on a horizontally extending smooth platform 19 as illustrated.

The second drive means 16 includes friction drive roller means 20 for engaging and moving the document 18 longitudinally past the scanning head 14. In the illustrative embodiment, the friction drive roller means includes a journal mounted lower friction roller 22 and a journal mounted upper friction roller 24 which is mounted for slight vertical movement relative to the lower roller and which is urged downwardly against the lower roller by means such as the illustrated coiled spring 26, one such spring being disposed at each of its ends. For reasons which will be appreciated as this description progresses, the two rollers 22, 24 are disposed uniformly to engage the document 18 to move the document 18 in a direction always perpendicular to the direction of the transversely printed lines of data on the document. In our system, this is accomplished by having the lower roller 22 journal mounted for rotation about a fixed, horizontally extending axis, parallel to the platform 19, and the upper roller 24 mounted for slight vertical movement, but yieldably and uniformly urged downwardly against the lower roller. The springs 26 are effective to keep the axis of rotation of the upper roller generally parallel to the axis of rotation of the lower roller 22. The platform 19 is provided with a transversely extending slot 27 through which a peripheral portion of the roller 22 extends to engage the document 22.

The drive means 16 further includes a preferably continuously running constant speed motor 28, electrically operated clutch means 30 and electrically operated brake means 32 associated with the motor. The lower roller 22, in the illustrative embodiment, is drivingly connected to the motor 28 by means such as the illustrative gears 34, 36. The clutch means 30 is effective, when operated, i.e., when energized, drivingly to connect the gear 36, and consequently the lower roller 22, to the rotating output shaft of the motor 28. The brake means 32 is effective, when operated, i.e., when energized, to stop rotation of the gear 36 and, therefore, to stop rotation of the lower roller 22. It will be appreciated as this description progresses that, at the same instant that the clutch means 30 is deenergized to disengage the roller 22 from the motor 28, the brake means 32 is energized positively to stop the roller 22 to locate the document 18 relative to the scanning head 14.

The manner in which the motor 28, clutch means 30 and brake means 32 are illustrated in FIG. 1 is not important to our present invention. Any number of types of drive motors, electrically operated clutch means and electrically operated brake means can be assembled together to act as an assembly to drive an element when the clutch means is energized and to stop rotation of the element when the brake means is energized.

We have found that one of the most critical problems involved in optically reading printed lines of data involves moving the scanning head 14 along and above the line of data at a constant speed with the scanning head movement being completely smooth and linear. If the scanning head movement is jerky, hesitant, or, for any reason, not smooth, the output of the scanning head will not be satisfactory.

Our preferred system includes a transversely extending, cylindrically shaped guide rod 38 which extends between a pair of illustrative upstanding brackets 40, 42. It will be appreciated that these same brackets 40, 42 may support the rollers 22, 24 as illustrated. The axis of the guide rod 38 is preferably exactly parallel to the axis of the roller 22 and the upper surface of the platform 19. Further, the axis of the guide rod 38 is parallel to a plane which is perpendicular to the plane of the platform 19 and which includes the axis of the roller 22.

We provide a carriage 44 to which the scanning head 14 is fastened, the carriage 44 being mounted on the guide rod 38 by means of an antifriction bushing 46. We prefer that the bushing 46 be a precision ball-bushing of a conventional type. The bushing 46 may also be a solid bushing of the type which is manufactured from a porous metallic material impregnated with a lubricant. The purpose of the bushing 46, of course, it to provide a smooth free movement of the carriage 44 on the guide rod 38.

We provide a stabilizing rod 46 disposed above the guide rod 38 to extend parallel thereto between the brackets 40, 42. Antifriction means 48 is carried by the carriage 44 and arranged to engage the stabilizing rod 46 to prevent movement of the carriage about the axis of the guide rod 38 without impeding axial movement of the carriage. In the illustrative embodiment, the antifriction means 48 includes a pair of roller bearings 49 and a trunnion 50 supporting each of said bearings, the bearings being disposed rollably to engage, respectively, opposite sides of the stabilizing rod. The roller bearings 49 mounted on the trunnions 50 may be conventional precision roller bearings having an inner race and an outer race separated by a plurality of ball bearings. We prefer that the outer races of these bearings 49 engage diametrically opposite portions of the cylindrically shaped stabilizing rod 46. In the illustrative embodiment, the stabilizing rod 46 is disposed directly above the guide rod 38 such that is axis lies in a vertical plane including the axis of the guide rod 38.

Now that we have discussed our preferred means for supporting the scanning head 14 for transverse movement, we turn to a description of our first drive means 12 for reciprocating the scanning head. The first drive means 12 comprises a drive pulley 60 which may be journal mounted on the bracket 42 as illustrated in FIG. 1, a second motor 62 which preferably runs continuously and at a constant speed when the system 10 is energized, and a pair of vertically spaced apart idler pulleys 64, 66 journal mounted for free rotation on the bracket 40 as illustrated in FIG. 1. We provide a flexible means 68, which may be a conventional steel wire cable, trained about the pulleys 60, 64, 66. We prefer that the cable 68 be wrapped one and one-half times about the outer periphery of the drive pulley 60 (FIG. 1a) and that the cable be fastened to the drive pulley 60 at one point on its periphery as indicated at 70 by means such as the fastening element indicated at 71. The cable 68 is wrapped one and one-half times about the drive pulley 60 because one and one-half times the circumference of the drive pulley is at least equal to the desired transverse travel for the carriage 44 on which the scanning head 14 is mounted.

Figure 1A:
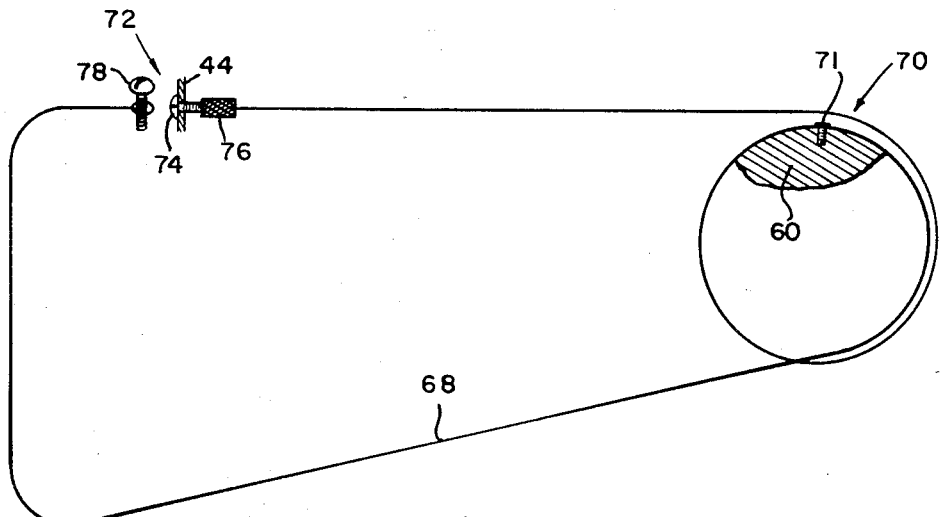
FIG. 1a is a diagrammatical view showing the path of the drive cable for the scanning head.

Further, we prefer that the scanning head 14, i.e., the carriage 44, be fastened to a point on the cable 68 as indicated at 72. As illustrated in FIG. 1a, we break the cable 68 and attach one end of the cable to the carriage 44 by takeup means comprising a screw 74 which threadedly engages a sleeve member 76 attached to that end of the cable. The other end of the cable 68 may be attached to the carriage 44 by means such as the illustrated screw 78. The takeup means just described is, therefore, effective to determine the tension on the cable between the drive pulley 60 and the carriage 44.

We provide a second electrically operated clutch means 80 which is effective, when energized, drivingly to connect the drive pulley 60 to the continuously running motor 62. When the clutch means 80 is energized, the drive pulley 60 is driven in the direction of the arrow 81 to move the scanning head 14 in the direction of the arrow 81a. The manner in which the clutch means 80 is controlled will be discussed hereinafter.

In order to provide a controlled resistance to the pull of the drive pulley 60 as well as means for returning the scanning head 14 to its initial starting position when the clutch means 80 is deenergized to release the drive pulley 60, we provide an elongated coiled tension spring 82, one end of which is connected to the lower portion of the bracket 42 as indicated at 84. The other end of the coiled spring 82, which is trained about a pair of vertically spaced-apart pulleys 86, 88 journal mounted on the bracket 40, is connected to the carriage 44 by means such as the fastening element 90. Thus, the coiled spring 82 extends from the point 84 about the pulleys 86, 88 to the carriage 44 to provide, when the scanning head is at the end of its travel away from its initial starting position, two runs of the spring extending generally in the direction of movement of the scanning head with the length of each run being equal to the distance through which the scanning head is moved in its scanning operation. These two runs of the spring 82, and the run of the spring between the pulleys 86, 88 provide a controlled resistance to the movement of the scanning head in the direction of the arrow 81a. This controlled resistance is such as to permit the scanning head to move at a uniformly controlled speed. It will be appreciated that the pulleys 64, 66 and 86, 88 may be journal mounted, respectively, for rotation about the same generally horizontally extending axes.

In FIG. 1, we show the drive pulley 60 provided with reduced diameter portions 60a, 60b about which the cable 68 may be trained to reduce the speed of movement of the scanning head 14. It will be appreciated that this means of changing the speed of movement of the scanning head 14 is only illustrative and that the speed may be changed by providing a motor 62 capable of operation at two or more selected constant speeds or, simply, by changing the motor.

Figure 2:
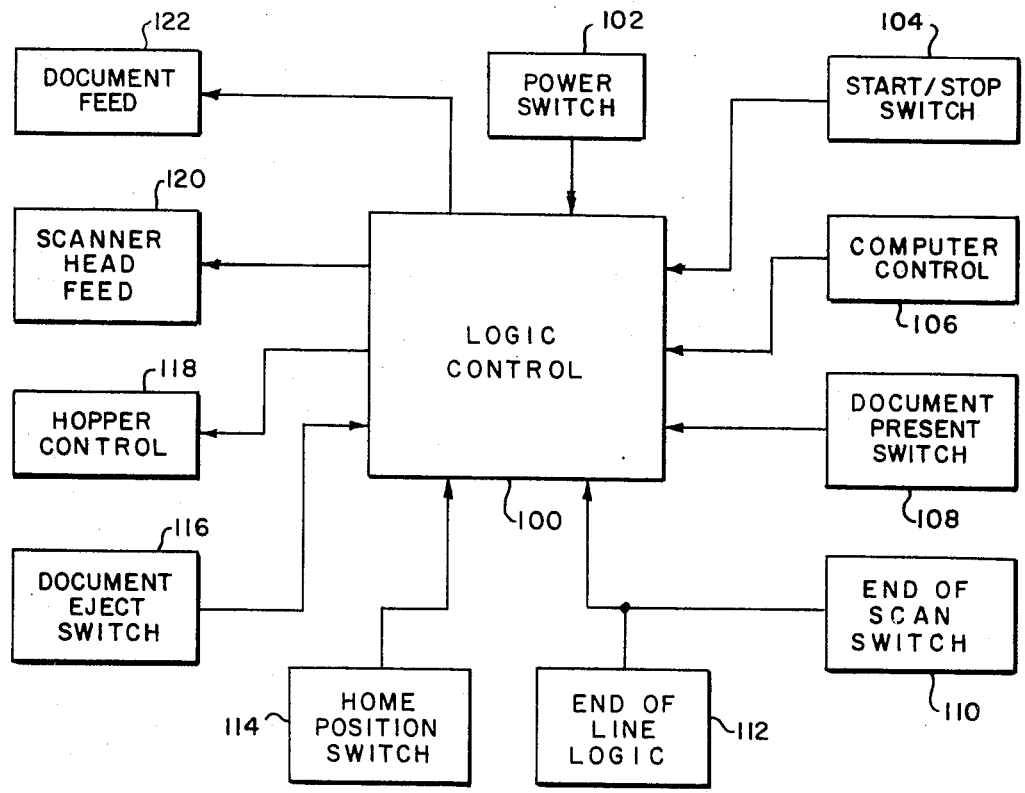
FIG. 2 is a block diagram view showing the manner in which we use a centralized logic control for the document feed and the movement of the scanning head.

Referring now to FIG. 2, our logic control 100 for the system 10 and particularly for the drive means 12 and 16 will be discussed. In FIG. 2, we show a plurality of inputs to the logic control 100 and a plurality of outputs from the logic control. For instance, we show a power switch 102 which may be any conventional switch means for providing power to the system 10 and to the logic control 100 circuitry and a start-stop switch 104 which may be used by the operator of the system 10 manually to start and stop the system. The rest of the inputs to and outputs from the logic control 100 will be discussed in the following paragraphs.

We show a computer control 106 to indicate that one of the inputs to the logic control 100 may be the output of a computer so that our system 10 can be operated selectively to provide the computer data corresponding to data being read from documents.

Further, we show a document present switch 108, end of scan switch 110, end of line logic 112 and home position switch 114, each of which may provide inputs to the logic control 100. The switch 108, which may be a photocell system for detecting the presence of a paper document, will indicate to the logic control 100 that there is a document to be read. The end of scan switch 110 will indicate to the logic control 100 that the scanning head 14 has moved to the end of its travel to trip the switch 110. The end of line logic 112 is means for detecting the presence of a printed code indicating an end of the line being read so that the scanning head 14 can be returned to its initial starting position before it reaches the end of its travel on the rod 38. Further, the home position switch 114 is a switch operated by the scanning head in its initial starting position to indicate to the logic control 100 that the scanning head can be moved from its initial starting position.

We prefer to provide a document eject switch 116 which can be used by the operator of the system 10 to cause the document being read quickly to be ejected from the system. Such a switch 116 would, in effect, cause the rollers 22, 24 to drive continuously to eject the document.

Our system is designed to be operated with a hopper for feeding documents one at a time to the platform 19 to be moved by the rollers 22, 24. Thus, a hopper control 118 may be connected to the logic control 100 so that the logic control output can operate the hopper.

When conditions are satisfied so that a line of data can be optically scanned, the logic control provides an output to the scanner head feed indicated at 120. It will be appreciated that this scanner head feed 120 may represent means such as the clutch means 80 which drivingly connects the drive pulley 60 to the motor 62. After a line of data has been read, the logic control 100 provides an output to a document feed indicated at 122, which is effective to cause movement of the document longitudinally under the scanning head 14 path of movement. It will be appreciated that the document feed 122 may be the clutch means 30 which drivingly connects the roller means 20 to the motor 28.

For a description of the types of switches which may be used to indicate position of the scanning head 14, presence of a document, etc. as discussed in conjunction with FIG. 2, we refer to the aforesaid Zappia application Ser. No. 828,238 filed May 27, 1969.

Figure 3:
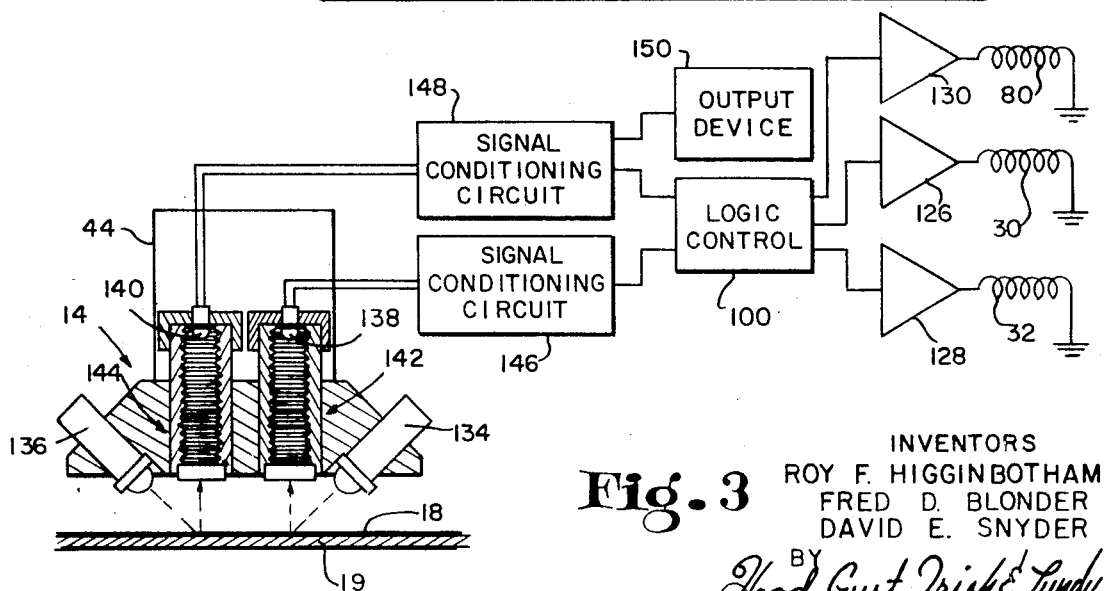
FIG. 3 is a schematic view showing how reflected light from the document being read is processed.

Referring now to FIG. 3, it will be seen that we have shown the scanning head 14 illustrated somewhat diagrammatically as well as the manner in which its outputs are fed to the logic control 100 and utilized thereby. For instance, we show coils representing clutch means 30 and brake means 32, respectively, the coils being connected to the logic control 100 by means of amplifiers 126, 128, respectively. Additionally, we show a coil representing clutch means 80, this coil being connected to the logic control 100 by means of an amplifier 130.

The scanning head 14 carries two separate optical systems, one for finding a line of data to be read and the other for reading the line of data. Each optical system includes a light source 134, 136 arranged to project light at the document 18, a light-responsive semiconductor device 138, 140, and optical means 142, 144 for projecting light reflected from the document toward the semiconductor device 138, 140. A discussion of this optical arrangement can be found in the aforesaid Zappia application Ser. No. 828,238, filed May 27, 1969.

The output of the semiconductor device 138 is fed to a signal conditioning circuit 146 and through that circuit to the logic control 100, the optical system represented by the light source 134, device 138 and optical means 142 being used to find a line of data to be read. Specifically, it is our concept to have each line of data to be read to begin with a dark spot. As the document 18 moves longitudinally past the scanning head 14 which is in its initial starting position, the amount of light projected at the device 138 will depend upon the presence or absence of such spots at the beginning of a line of data to be read. This concept is fully disclosed in the aforesaid Zappia application Ser. No. 828,238. Once the device 138 electrically changes state to indicate that a line of data to be read is directly under the scanning head 14, the logic control 100 will provide outputs to the clutch means 30 and brake means 32 to stop longitudinal movement of the document as well as an output to the clutch means 80 to start transverse movement of the scanning head 14.

The output of the light-responsive device 140 is fed to a signal conditioning circuit 148, the output of which is fed to the logic control 100 as well as an output device indicated at 150. This output device indicated at 150 may be a conventional teletype machine or any other such machine as discussed in the aforesaid Zappia application Ser. No. 828,238. The output of the signal conditioning circuit 148 which is fed to the logic control 100 is for control purposes as will be discussed hereinafter.

Figure 4:
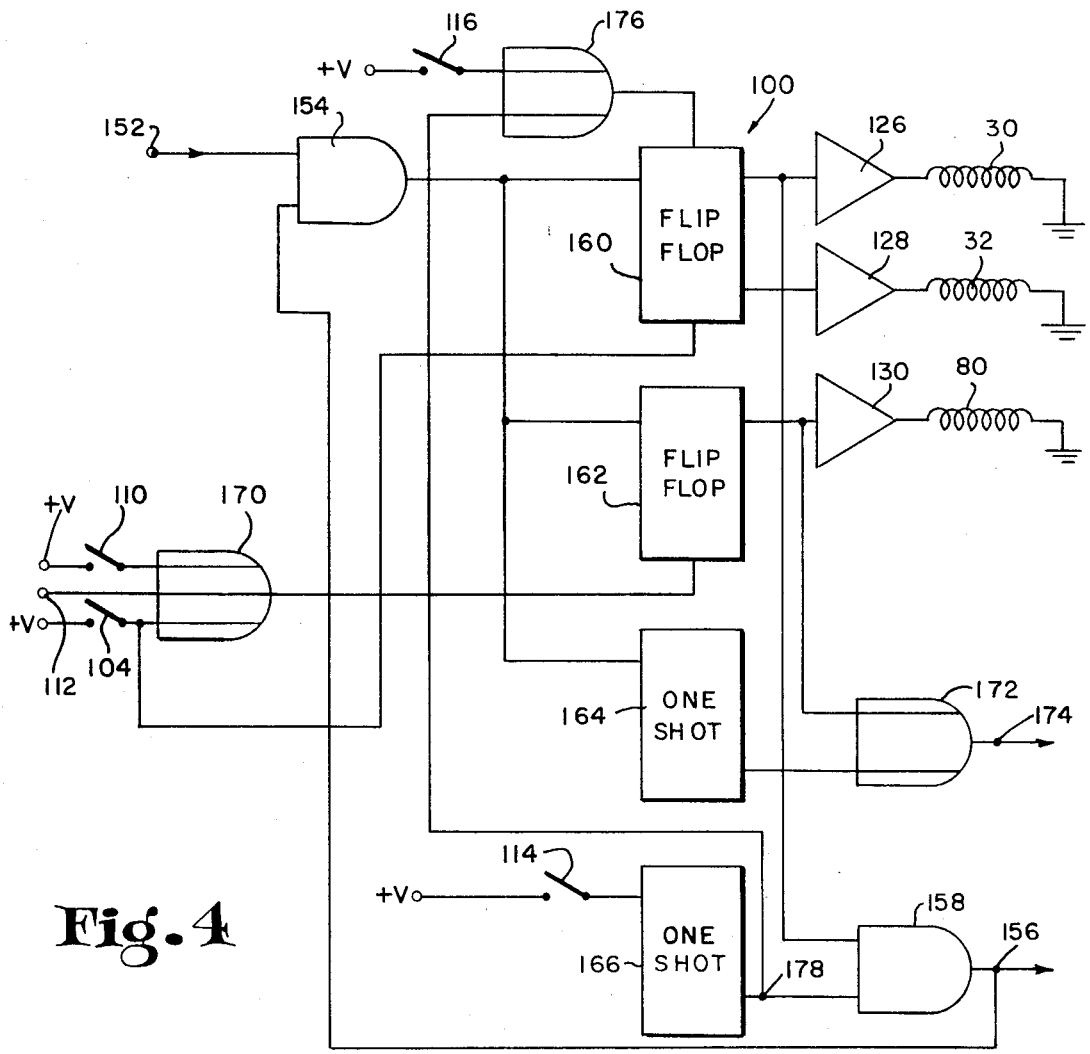
FIG. 4 is a simplified diagram showing our logic control and the manner in which it is used.

Referring now to FIG. 4, a simplified block diagram of our logic control 100 will be discussed. It will be seen that many of the switches and control functions shown in FIG. 2 also appear in FIG. 4.

The output of the signal conditioning circuit 146 is fed to a terminal 152 which provides an input to an And-gate 154. The other input to the And-gate 154 is provided from the output 156 of an Or-gate 158.

Our preferred logic control 100 includes a bistable multivibrator or flip-flop 160, another bistable multivibrator or flip-flop 162, a monostable multivibrator 164, hereinafter called the transient one-shot 164, and another monostable multivibrator 166, hereinafter called the advance one-shot 166. These circuits 160, 162, 164, 166 are conventional and well known and need not be discussed, in detail, in this description. Likewise, the And gates and Or gates of our logic control 100 are conventional circuits well known in the art. For instance, it is well known that a flip-flop circuit has two output points so that one point is active when the flip-flop is in its "set" condition and that the other point is active when the flip-flop is in its "reset" condition. The flip-flop will always be in one of its two conditions, i.e., its "set" or "reset" condition. A one-shot circuit is a circuit that will react to an input to provide an output a predetermined time thereafter. The manner in which the one-shot circuits 164, 166 are used in our logic control 100 will become apparent as this description progresses.

The amplifier 126 serves as circuit means connecting the clutch means 30 to one output of the flip-flop 160 and the amplifier 128 serves as circuit means connecting the brake means 32 to the opposite output of the flip-flop 160. The clutch means 80 is connected to one output of the flip-flop 162 by the amplifier 130 so that the clutch means 80 will be energized when the flip-flop 162 is in one of its two conditions and deenergized when the flip-flop is in the other of its two conditions.

The start-stop switch 104, the end of scan switch 110 and the function referred to as the end of line logic 112 each provide an input to an Or-gate 170, the output of which is fed to the flip-flop 162 as illustrated. Thus, the condition of the flip-flop 162 is changed when any one of the inputs to the Or-gate 170 is provided with a signal. For instance, when the scanning head 14 reaches the end of its travel to hit the end of scan switch 110, the flip-flop 162 changes condition to deenergize the clutch means 80 to permit the drive pulley 60 and the scanning head 14 to be returned to their initial starting positions by the spring 82. Once this has happened, the flip-flop 162 will not change its condition to energize the clutch means 80 until it receives an input from the output of the Or-gate 154. The Or-gate 170 acts in a conventional fashion to provide an output when any one of its inputs is energized.

The output 156 of the Or-gate 158, in addition to providing an input to the And-gate 154, also is effective to inhibit the line find circuitry. This may be done by disabling the signal conditioning circuitry 146 associated with the light-responsive device 138.

We also provide an Or-gate 172, the output 174 of which is effective to inhibit the read circuitry of our system 10. This output may be used, for instance, to disable the signal conditioning circuitry 148 associated with the light-responsive device 140.

Finally, we use an Or-gate 176, the output of which is effective to change the flip-flop 160 to its "set" condition to energize the clutch means 30. One input to the Or-gate 176 is the document eject switch 116. When the switch 116 is closed, the flip-flop 160 is operated to energize the clutch means 30 continually to run the rollers 122, 124 to eject the document 18. The other input to the Or-gate 176 is provided by the output 178 of the one-shot 166.

With the above description of the logic control 100 in mind, we provide the following operational description. In the initial condition, flip-flop 160 is in its "set" condition causing the clutch means 30 to be energized to drive the rollers 22, 24 to feed the document 18 and the flip-flop 162 is in its "reset" condition causing the clutch means 80 to be deenergized so that the scanning head 14 is in its initial starting position.

When the document 18 is fed to a position such that light from the source 134 is reflected from a "line find" mark at the beginning of a line of data on the document 18, the signal conditioning circuit 146 provides an output at terminal 152 which is an input to And-gate 154. And-gate 154 is thereby activated by this input signal to provide an output which is effective to trigger flip-flop 160 to its "reset" condition which is effective to deenergize clutch means 30 and to energize immediately brake means 32 to stop the rollers 22, 24. It will be appreciated that the signal processing by the circuit 146, And-gate 154 and flip-flop 160 is extremely rapid so that the clutch means 30 is deenergized and the brake means 32 is energized immediately as soon as the light-responsive device 138 changes state. In addition, the output of the And-gate 154 triggers the flip-flop 162 to its "set" condition effective to energize the clutch means 80 drivingly to connect the pulley 60 to the motor 62 to start movement of the scanning head 14 from its initial starting position. During this transient startup movement of the scanning head 14, we desire to inhibit the read circuitry by connecting the output of the And-gate 154 to the input of the transient one-shot 164, the output of which activates the Or-gate 172 to provide the inhibiting function at its output 174. The reading is inhibited for a very short period of time to permit the scanning head 14 to begin its movement along the guide rod 38 at a constant speed.

Once the scanning head 14 is moving to read a line of data, it will continue to move until the scanning head closes the switch 110, or until a code representing the end of the line is read to provide an input at the point 112 to the Or-gate 170 or until the stop switch 104 is closed. When any one of these conditions occurs, the Or-gate 170 triggers the flip-flop 162 to its "reset" condition effective to deenergize the clutch means 80. This changing of the flip-flop 162 to its "reset" condition provides an output which is fed to the Or-gate 172 as an input so that its output 174 will be effective to inhibit the read circuitry.

When the clutch means 80 is deenergized, the scanning head 14 returns to its initial stating position to activate the home position switch 114 which in turn triggers the advance one-shot 166 to cause the line find circuitry (signal conditioning circuitry 146) to be inhibited through Or-gate 158 for a short period of time to prevent reading of the same line of data which has just been read. In other words, the one-shot 166 provides a period of time delay sufficient to permit the rollers 122, 124 to advance the document 18 to the next line of data. The output of the one-shot 166 is also fed to the Or-gate 176 to cause the Or-gate 176 to trigger the flip-flop 160 to its "set" condition effective to energize again clutch means 30.

At any time the operator of the system 10 may activate switch 104 to stop movement of the scanning head and of the rollers 22, 24 or the operator may close switch 116 to cause Or-gate 176 to trigger flip-flop 160 to its "set" condition to energize the clutch means 30 to eject the document 18.

It will be appreciated that the control system just described is an extremely fast and positive system such that the rollers 22, 24 can be stopped immediately upon the finding of a line of data to be read and such that the scanning head 14 can be moved along the line of data as soon as the document is stopped.

What is claimed is:

1. A system for optically reading data printed in transversely extending lines on a document comprising a scanning head, means for supporting said scanning head for transverse movement relative to such a document, first drive means for reciprocating said scanning head on said supporting means, second drive means for moving such a document longitudinally relative to said scanning head, said second drive means including friction drive roller means for engaging and moving such a document, a motor, electrically operated clutch means for drivingly connecting said roller means to said motor, and electrically operated brake means for stopping said roller means, and control means for said first and second drive means, said control means including means for optically detecting a line of data on such a document and operating said clutch means and brake means to stop such longitudinal movement of such a document and to start movement of said scanning head from its initial starting position.

2. The system of claim 1 in which said supporting means includes a transversely extending cylindrical guide rod, a carriage supporting said scanning head, an antifriction bushing supporting said carriage on said guide rod, a stabilizing rod extending parallel to said guide rod, and antifriction means carried by said carriage and engaging said stabilizing rod to prevent movement of said carriage about the axis of said guide rod.

3. The system of claim 2 in which said second rod is disposed adjacent said guide rod and in which said antifriction means includes a pair of roller bearings and a trunnion supporting each of said bearings, said bearing being disposed rollably to engage, respectively, opposite sides of said stabilizing rod.

4. The system of claim 1 in which said first drive means includes a drive pulley, a second motor, at least one idler pulley, and flexible means trained about said pulleys, said flexible means being fastened to said drive pulley at one point on the periphery thereof, and said scanning head being fastened to a point on said flexible means.

5. The system of claim 4 in which said first drive means includes a second electrically operated clutch means for drivingly connecting said drive pulley to said second motor, and return spring means resisting movement of said scanning head away from its initial position by said second motor.

6. The system of claim 5 in which said second motor is continuously running and in which said return spring means includes an elongated coiled tension spring, said spring being effective to return said scanning head to its said initial position when said second clutch means is operated to disengage said drive pulley from said second motor to permit said drive pulley to return to its initial starting position.

7. The system of claim 3 in which said first drive means includes a drive pulley, a second motor, at least one idler pulley, and flexible means trained about said pulleys, said flexible means being fastened to said drive pulley at one point on the periphery thereof, and said scanning head being fastened to a point on said flexible means.

8. The system of claim 7 in which said first drive means includes a second electrically operated clutch means for drivingly connecting said drive pulley to said second motor, and return spring means resisting movement of said scanning head away from its initial position by said second motor.

9. The system of claim 8 in which said second motor is continuously running and in which said return spring means includes an elongated coiled tension spring, said spring being effective to return said scanning head to its said initial position when said second clutch means is operated to disengage said drive pulley from said second motor to permit said drive pulley to return to its initial starting position.

10. The system of claim 9 including pulley means about which said coiled spring is trained, said pulley means and said coiled spring being disposed so that, when said scanning head is moved from its initial position to the end of its travel, there are two runs of said spring at least equal in length to the distance which said scanning head is moved by said drive pulley.

11. The system of claim 10 in which said flexible means includes a wire cable trained about said drive pulley and said idler pulley, and including takeup means arranged selectively to control the tension on said cable between said scanning head and said drive pulley.

12. The system of claim 1 in which said motor of said second drive means is continuously running, said clutch means being effective, when operated, drivingly to connect said roller means to said motor and said brake means being effective, when operated and said clutch means is operated to disconnect said roller means from said motor, to stop said roller means.

13. The invention of claim 1 in which said control means includes a flip-flop having two outputs, circuit means for connecting said electrically operated clutch means to one of said outputs and circuit means for connecting said electrically operated brake means to the other of said outputs, said flip-flop, clutch means and brake means being arranged so that said clutch means and said brake means are alternately energized.

14. The invention of claim 12 in which said control means includes a flip-flop having two outputs, circuits means for connecting said clutch means to one of said outputs and circuit means for connecting said brake means to the other of said outputs, said flip-flop, clutch means and brake means being arranged so that said brake means and clutch means are alternately energized.

15. The invention of claim 6 in which said control means includes a flip-flop having two outputs, circuit means for connecting said first mentioned clutch means of said second drive means to one of said outputs and circuit means for connecting said brake means to the other of said outputs, said flip-flop, first mentioned clutch means and brake means being arranged so that said first mentioned clutch means and brake means are alternately energized.

16. The invention of claim 15 in which said control means includes a second flip-flop having two outputs, said second clutch means being connected to one of its said outputs, said second flip-flop and said second clutch means being arranged so that said second clutch means is operated drivingly to connect said drive pulley to said second motor when said brake means is operated to stop said friction roller means.

17. The invention of claim 16 in which said means for optically detecting a line of data includes a light-responsive device, said control means including circuit means for conditioning the output of said device and a gating circuit connected to the output of the last said circuit means, the output of said gating circuit being a triggering input to said first mentioned and said second flip-flops.

18. A system for optically reading data graphically printed in transversely extending lines on a document comprising a scanning head, means for supporting said scanning head for transverse movement relative to such a document, first drive means for reciprocating said scanning head on said supporting means, second drive means for moving such a document longitudinally relative to said scanning head, and control means for said first and second drive means, said control means including means for optically detecting a line of data on such a document and stopping such longitudinal movement of such a document and starting movement of said scanning head from its initial starting position, said first drive means including a drive pulley, a motor, at least one idler pulley, flexible means trained about said pulleys, said flexible means being fastened to said drive pulley at one point on the periphery thereof, and said scanning head being fastened to a point on said flexible means, an electrically operated clutch means for drivingly connecting said drive pulley to said motor, and return spring means resisting movement of said scanning head away from its initial starting position by said motor.

19. The system of claim 18 in which said motor is continuously running and in which said return spring means includes an elongated coiled tension spring, said spring being effective to return said scanning head to its said initial position when said clutch means is operated to disengage said drive pulley from said motor to permit said drive pulley to return to its initial starting position.

* * * * *